(12) United States Patent
Hashimoto

(10) Patent No.: US 11,596,208 B2
(45) Date of Patent: Mar. 7, 2023

(54) FASTENER FOR PERSONAL ACCESSORIES

(71) Applicant: YUGEN KAISHA HOUSEKI-NO-ANGEL, Nagoya (JP)

(72) Inventor: Hisaziro Hashimoto, Nagoya (JP)

(73) Assignee: YUGEN KAISHA HOUSEKI-NO-ANGEL, Nagoya (JP)

( * ) Notice: Subject to any disclaimer, the term of this patent is extended or adjusted under 35 U.S.C. 154(b) by 0 days.

(21) Appl. No.: 16/606,617

(22) PCT Filed: Aug. 30, 2018

(86) PCT No.: PCT/JP2018/032039
§ 371 (c)(1),
(2) Date: Oct. 18, 2019

(87) PCT Pub. No.: WO2019/049759
PCT Pub. Date: Mar. 14, 2019

(65) Prior Publication Data
US 2020/0253338 A1    Aug. 13, 2020

(30) Foreign Application Priority Data
Sep. 8, 2017    (JP) .............................. JP2017-187155

(51) Int. Cl.
*F16B 2/20*        (2006.01)
*A44B 13/00*      (2006.01)
*F16B 45/02*      (2006.01)

(52) U.S. Cl.
CPC .......... *A44B 13/0029* (2013.01); *F16B 45/02* (2013.01)

(58) Field of Classification Search
CPC ........ A44B 13/0029; F16B 45/02; F16B 2/22; F16B 2/24; F16B 2/241; F16B 2/248; Y10T 24/44778
See application file for complete search history.

(56) References Cited

U.S. PATENT DOCUMENTS 189,004 A * 3/1877 Wilson ................... B65D 63/08
24/26
362,094 A * 5/1887 Keppler ............. A44B 13/0017
24/592.1

(Continued)

FOREIGN PATENT DOCUMENTS

EP    18852967        11/2020
JP    48008951 Y1    3/1973

(Continued)

*Primary Examiner* — Jason W San
(74) *Attorney, Agent, or Firm* — Rahman LLC

(57) ABSTRACT

A fastener for accessories includes a pair of a female part (1) and a male part (2). The female part (1) includes a holding frame body (12), a holding space (13) which is surrounded by the holding frame body (12), and an opening part (14) which can close elastically. The female part (1) further includes a guide part (15) for insertion at an outer side of the opening part (14). The male part (2) includes a circular locking frame body (22), a locking accepting part (25) which is surrounded by the locking frame body (22), and a locking part (21) which can close elastically at a tip of the locking frame body (22). The male part (2) further includes a guide part (23) for engagement/disengagement at an inner side of the locking part (21) and an outer shell on a periphery of the locking frame body (22).

12 Claims, 17 Drawing Sheets

(56) References Cited

U.S. PATENT DOCUMENTS

| | | | | |
|---|---|---|---|---|
| 586,177 | A | * | 7/1897 | Grapes .................... B42F 1/08 24/546 |
| D31,189 | S | * | 7/1899 | Wheeler .................... D12/162 |
| 688,620 | A | * | 12/1901 | Floerckey .......... A44B 13/0017 24/592.1 |
| 742,893 | A | * | 11/1903 | McGill .................... D06F 55/00 24/555 |
| 763,303 | A | * | 6/1904 | Mayers .................... B42F 1/08 24/547 |
| 1,590,172 | A | * | 6/1926 | Thorberg .............. A01K 11/00 24/3.1 |
| D75,691 | S | * | 7/1928 | Lampl .................... D19/65 |
| 1,728,560 | A | * | 9/1929 | Goshorn .............. A01K 91/04 24/601.1 |
| 1,992,093 | A | * | 2/1935 | Place .................... F16B 2/248 411/530 |
| 2,313,859 | A | * | 3/1943 | Anderson .............. B21F 45/16 29/3 |
| 2,365,520 | A | * | 12/1944 | Bogue .................... F02M 1/00 74/469 |
| 2,822,593 | A | * | 2/1958 | Sponsel .................... B42F 1/08 24/67.9 |
| 3,105,278 | A | * | 10/1963 | Sponsel .................... B42F 1/08 24/67.9 |
| 3,120,041 | A | * | 2/1964 | Christian .................... B42F 1/08 150/137 |
| 3,132,391 | A | * | 5/1964 | Steensland .............. B42F 1/08 24/67 R |
| 3,212,303 | A | * | 10/1965 | Haffner .................... D06F 41/00 68/235 D |
| 3,225,469 | A | * | 12/1965 | Chase .................... B42F 21/00 40/641 |
| 3,333,307 | A | * | 8/1967 | Wheeler .................... G09F 3/16 24/598.6 |
| 3,408,700 | A | * | 11/1968 | Chase .................... B42F 1/08 24/67.3 |
| 3,800,365 | A | * | 4/1974 | Bruggert .............. A01G 17/08 47/47 |
| 3,936,914 | A | | 2/1976 | Mancini |
| 4,234,998 | A | * | 11/1980 | McMickle .............. F16B 2/248 24/601.3 |
| 4,324,025 | A | * | 4/1982 | Apri .................... B42F 1/08 24/551 |
| 4,665,594 | A | * | 5/1987 | Wagner .................... A44B 15/00 24/3.6 |
| 4,696,120 | A | * | 9/1987 | Schroeder .............. A01K 91/04 24/601.3 |
| D301,897 | S | * | 6/1989 | Wagner .................... D19/65 |
| 5,210,912 | A | * | 5/1993 | Hoefkes .............. F16G 11/046 24/129 C |
| 5,319,835 | A | * | 6/1994 | Chao .................... B42F 1/08 24/546 |
| 5,553,363 | A | * | 9/1996 | Chen .................... A44B 9/14 24/353 |
| 5,729,870 | A | * | 3/1998 | Sharp .................... A45F 5/02 24/3.6 |
| 5,979,021 | A | * | 11/1999 | Swift .................... A41D 25/003 24/546 |
| 6,122,806 | A | * | 9/2000 | Umezawa .............. B60N 2/5825 24/546 |
| 6,226,843 | B1 | * | 5/2001 | Crainich .............. A61B 17/1227 24/545 |
| 6,467,135 | B1 | * | 10/2002 | Schuster .................... A44B 19/262 24/387 |
| 7,448,155 | B2 | * | 11/2008 | Dolas .................... A45C 1/06 150/137 |
| 7,516,523 | B2 | * | 4/2009 | Okot .................... A44B 19/265 24/385 |
| D657,282 | S | * | 4/2012 | dos Santos Villar Filho .............. D11/56 |
| 8,925,157 | B2 | * | 1/2015 | O'Daniel .................... B42F 1/08 24/67.9 |
| D723,970 | S | * | 3/2015 | Tomaselli .................... D11/86 |
| D727,625 | S | * | 4/2015 | Ellingson .................... D3/328 |
| D744,895 | S | * | 12/2015 | Burns .................... D11/133 |
| 9,341,203 | B1 | * | 5/2016 | Disharoon .............. F16B 2/248 |
| D890,621 | S | * | 7/2020 | Abloh .................... D11/44 |
| 2004/0064920 | A1 | * | 4/2004 | Arduini .................... B42F 1/08 24/67.9 |
| 2005/0035605 | A1 | * | 2/2005 | Vanderwater-Piercy .................... A45C 13/18 292/308 |
| 2006/0107496 | A1 | * | 5/2006 | Cheng .................... B42F 1/08 24/67.9 |
| 2008/0022498 | A1 | * | 1/2008 | Griffith .................... F16B 45/02 24/598.7 |
| 2011/0258813 | A1 | * | 10/2011 | Lu .................... B42F 1/08 24/67.9 |
| 2014/0090210 | A1 | * | 4/2014 | Tillinghast .............. A45C 1/06 24/67.9 |
| 2014/0157554 | A1 | * | 6/2014 | Hammond .......... A01K 27/008 24/369 |
| 2015/0176618 | A1 | * | 6/2015 | Thieme .................... B21D 11/10 24/546 |
| 2015/0275958 | A1 | * | 10/2015 | Jacobson .................... F16B 45/00 24/301 |
| 2016/0047084 | A1 | * | 2/2016 | Biller .................... D06F 95/008 24/546 |
| 2016/0084292 | A1 | * | 3/2016 | Kaneko .................... A45C 13/30 24/592.1 |
| 2018/0216700 | A1 | * | 8/2018 | Horgan .................... F16G 11/046 |
| 2020/0079271 | A1 | * | 3/2020 | Villacres Mesias .... F16B 45/02 |
| 2020/0352574 | A1 | * | 11/2020 | Ramsey .................... A61B 17/122 |

FOREIGN PATENT DOCUMENTS

| | | |
|---|---|---|
| JP | 153778/1975 U | 12/1975 |
| JP | 089017/1982 U | 6/1982 |
| JP | 141512/1982 U | 9/1982 |
| JP | 115980/1984 U | 8/1984 |
| JP | 025417/1985 U | 2/1985 |
| JP | 116514/1986 U | 7/1986 |
| JP | 064208/1992 U | 6/1992 |
| JP | 3041044 U | 9/1997 |
| JP | 2002037582 A | 2/2002 |
| JP | 2016221179 A | 9/2016 |
| WO | 2019049759 A1 | 3/2019 |

* cited by examiner

FASTENER FOR PERSONAL ACCESSORIES

CROSS-REFERENCE TO RELATED APPLICATIONS

This application is a 371 national stage application of PCT/JP2018/032039 filed on Aug. 30, 2018, which claims priority to Japanese Patent Application No. 2017 187155 filed on Sep. 8, 2017, the complete disclosures of which, in their entireties, are herein incorporated by reference.

BACKGROUND OF THE INVENTION

Field of the Invention

The present invention relates to a fastener for accessories such as necklace, bracelet, anklet, key holder, bag, belt, seatbelt and the like.

Description of the Related Art

One of the conventional fasteners for accessories is disclosed in reference 1. The first reference shows a fastener whose male part can be engaged/disengaged from a female part by twisting the male part almost 90 degrees to a longitudinal direction.
Patent reference 1: Japanese patent publication number No. 2016-221179

BRIEF SUMMARY OF THE INVENTION

However, the above-mentioned fastener has its disadvantages mentioned below. The fastener shown in reference 1 opens only in an up and down direction and is not a type of fastener, which requires twisting each part. It also does not have a guide part exclusive for engagement/disengagement or an engagement-separating gap inside the female part. Therefore, when it is engaged, the male part has to be rotated 90 degrees to a longitudinal direction and then pushed into the female part. There are two main problems with reference 1. Firstly, the female part is required to have a hole (an eye) in which the male part can move smoothly. In addition, the male part is required to have another part for pinching of fingers since a locking-accepting part at the tip of the male and a locking-frame body need to be inserted into the holding section of the female part. Due to this, the length of the female part and the male part can be almost twice as conventional fasteners. It makes a fastener more costly and heavier because products made from gold/platinum are usually quite expensive. It can also spoil the appearance of the accessories. Secondly, in case a user rotates the male part 90 degrees, a position where the user pinches, is positioned in an axis around where the male part circularly moves. A position, where an opening of the female part contacts a side of the male part, is located outside the axis. As a result, the male part cannot be engaged or disengaged with the female part unless the user pinches strongly. Generally, a fastener for accessories such as a necklace is slippery, since users may apply a cosmetic, hand cream and the like to their hands. Furthermore, since users have to engage or disengage the fastener at the back of his/her neck, it is impossible to check whether the male part rotates 90 degrees or not.

Firstly, a fastener for accessories should be as small as possible. Secondly, a fastener for accessories should be engaged or disengaged without a strong pinching force by the fingers.

More preferably, to handle a fastener for accessories easier, a male part and a female part can be engaged or disengaged with one another by pulling them along a longitudinal direction in almost the same state or by twisting one another.

DISCLOSURE OF INVENTION

In order to solve the above-mentioned issues, the fastener for accessories of the present invention comprising a pair of a female part and a male part, wherein the male part comprises a circular locking frame body, which is formed continuously linear or non-continuously linear, a locking accepting part, which is surrounded by the locking frame body, and a locking part, which is located at a tip of the locking frame body, wherein the female part comprises a circular holding frame body, which is formed non-continuously linear, and a holding space, which is surrounded by the holding frame body, wherein the female part further comprises an opening part, which can close elastically, at a tip of the holding frame body, wherein said opening part has a guide part for insertion outside, wherein a length of the opening part of the female par is shorter than a length between the locking frame bodies of the male part, wherein the female part further comprises a engagement-separating gap, which is located at a tip of the opening part or an inner side of said tip, for disengagement in order for the locking part of the male part to move from the holding space to an outer space, and wherein said engagement-separating gap is opened by pulling the female part from the male part while twisting, then the fastener for accessories will be disengaged.

In this fastener for accessories, preferably, wherein the tip of the locking frame body of the male part has a pair of locking parts, and an inner side of the pair of the locking parts has a guide part for engagement/disengagement, wherein a tip of the holding frame body of the female part comprises a pair of opening parts which can close elastically, and wherein an outside of said pair of opening parts comprises a guide part for insertion.

In this fastener for accessories, preferably, wherein a rear part of the female part is connected to a side of a chain, and wherein a cross-section shape of the holding frame body of the female part is characterized in that a ratio of a vertical length is 1 to less than 2 of a horizontal length, or the cross-section shape is characterized in that a ratio of a horizontal length is 1 to less than 2 of a vertical length.

In this fastener for accessories, preferably, wherein a tip of the holding frame body of the female part comprises a pair of opening parts, wherein an outside of the opening parts comprises the guide part for insertion, and wherein a tip side of one opening part is opposed to the guide part of another opening part, or the tip side of the one opening part is around a centerline along a longitude axis and is not parallel to the centerline along the longitude axis.

In this fastener for accessories, preferably, wherein the tip of the holding frame body of the female part comprises a pair of the opening parts, and wherein a tip of one opening part of the female part extends longer toward a inner direction than another opening part of the female part.

In this fastener for accessories, preferably, wherein the tip of the holding frame body of the female part comprises a pair of the opening part, wherein an outer side of the pair of the opening part of the female part comprises a guide part for insertion, wherein an inner side of one opening part has a guide part for engagement/disengagement, and wherein a tip side of another opening part of the female part is opposed to a tip of the one opening part of the female part, or the guide part for insertion.

In this fastener for accessories, preferably, wherein the male part further comprises a circular locking frame body, which is formed non-continuously linear, a locking accepting part, which is surrounded by the locking frame body, and a locking part, which can close elastically at a tip of the locking frame body, wherein the male part further comprises an engagement-separating gap at the tip of the locking part or an inner side of the tip of the locking part, and a neck part, wherein the male part further comprises a guide part for engagement/disengagement at the front of the locking accepting part or an inner side of the locking part, and wherein the male part further comprises an outer shell which is formed continuously linear or non-continuously linear.

In this fastener for accessories, preferably, wherein the female part comprises an opening part at the tip of the holding frame body, wherein the opening part has a protrusion extending to the center of the holding space, said protrusion catches the opening part of the holding frame body of the female part inside the locking frame body of the male part, and wherein the female part further comprises a non-return claw which can prevent the holding frame body from opening.

In this fastener for accessories, preferably, wherein the female part comprises opening parts at the tip of the holding frame body, wherein an inner angle between a holding frame body and an opening part is between more than 45 degrees and less than 90 degrees.

Effects of the Invention

For example, as shown in the embodiment 7 below, a fastener for accessories comprises a guide part for insertion located at the outer side of an opening part of the female part, and a guide part at the inner edge of a locking part of the male part. In addition, the male part has an outer shell on a periphery of a locking frame body. The fastener for accessories can be easily engaged by pushing the locking part of the male part onto the guide part for insertion of the female part. On the contrary, twisting and pulling the male part from the female part can easily disengage the fastener for accessories. The present invention has an object to provide a fastener for accessories, which comprises a female part or a male part having an engagement-separating gap inside or a guide part for engagement/disengagement. With this configuration, the fastener for accessories can be smaller and easily engaged/disengaged by pinching the parts lightly.

DETAILED DESCRIPTION OF THE INVENTION

Embodiment 1

Figure 1:
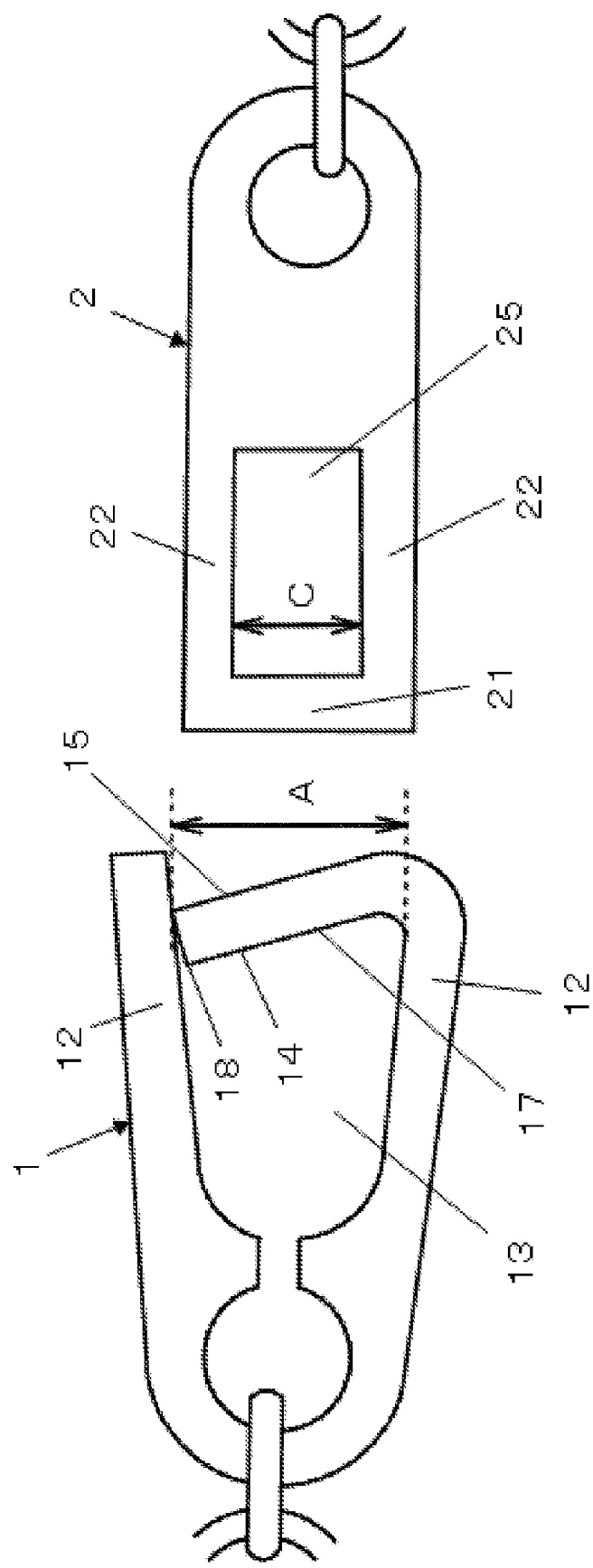
FIG. 1 shows a whole view of a fastener for accessories according to Embodiment 1 of the present invention. The length (C) of a locking part (21) of a male part (2) is shorter than the length (A) of an opening part (14) of a female part (1).
Figure 2:
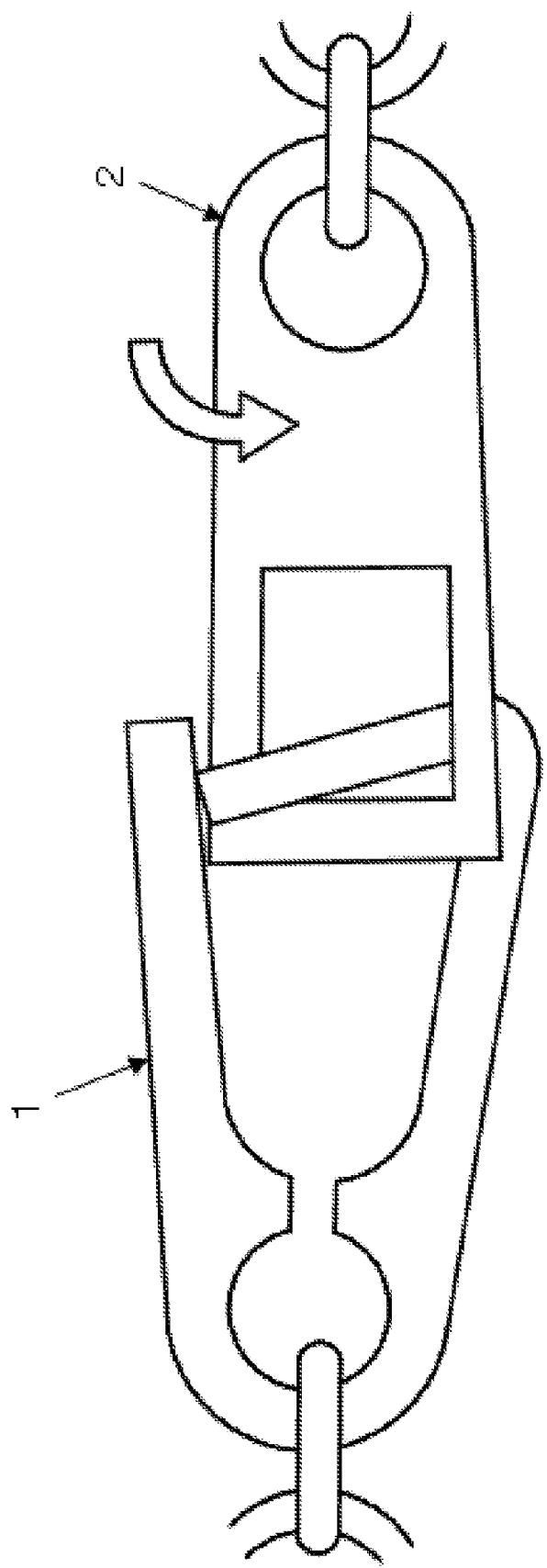
FIG. 2 shows a whole view of a fastener for accessories according to Embodiment 1. This figure shows the start of a disengagement state by twisting the female part (1) or the male part (2). However, since a locking frame body (22) of the male part (2) is caught at the tip of the opening part (14), the male part (2) cannot be disengaged from the female part (1).

Referring to the drawings, the Embodiment of a fastener for accessories according to the present invention will be explained. Embodiments 1 to 9 of the present invention will be described hereinafter with reference to the drawings. It is to be understood that the embodiments described herein are not intended as limiting, or encompassing the entire scope of the present invention.

The fastener for accessories according to Embodiment 1 comprises a female part (1) and a male part (2). In case when the female part (1) and the male part (2) are engaged with one another, an outer part of a locking part (21) belonging to the male part (2) is pushed against a guide part (15) or is twisted against the guide part (15). As a result, an opening part (14) of the female part (1) will be opened. Then, the locking part (21) of the male part (2) is pushed into a holding space (13) of the female part (1) and the male part (2) is engaged with the female part (1) in the end.

Figure 3:
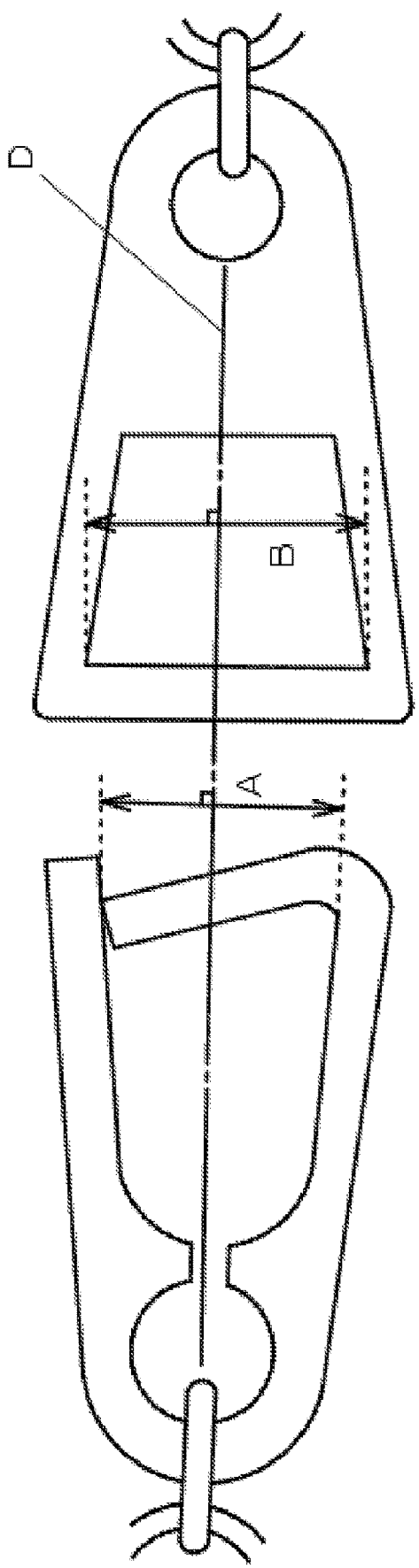
FIG. 3 shows an explanatory view of the parts belonging to the fastener for accessories according to Embodiment 1 of the present invention. The length (B) of the locking part (21) is longer than the length (A) of the opening part (14).
Figure 4:
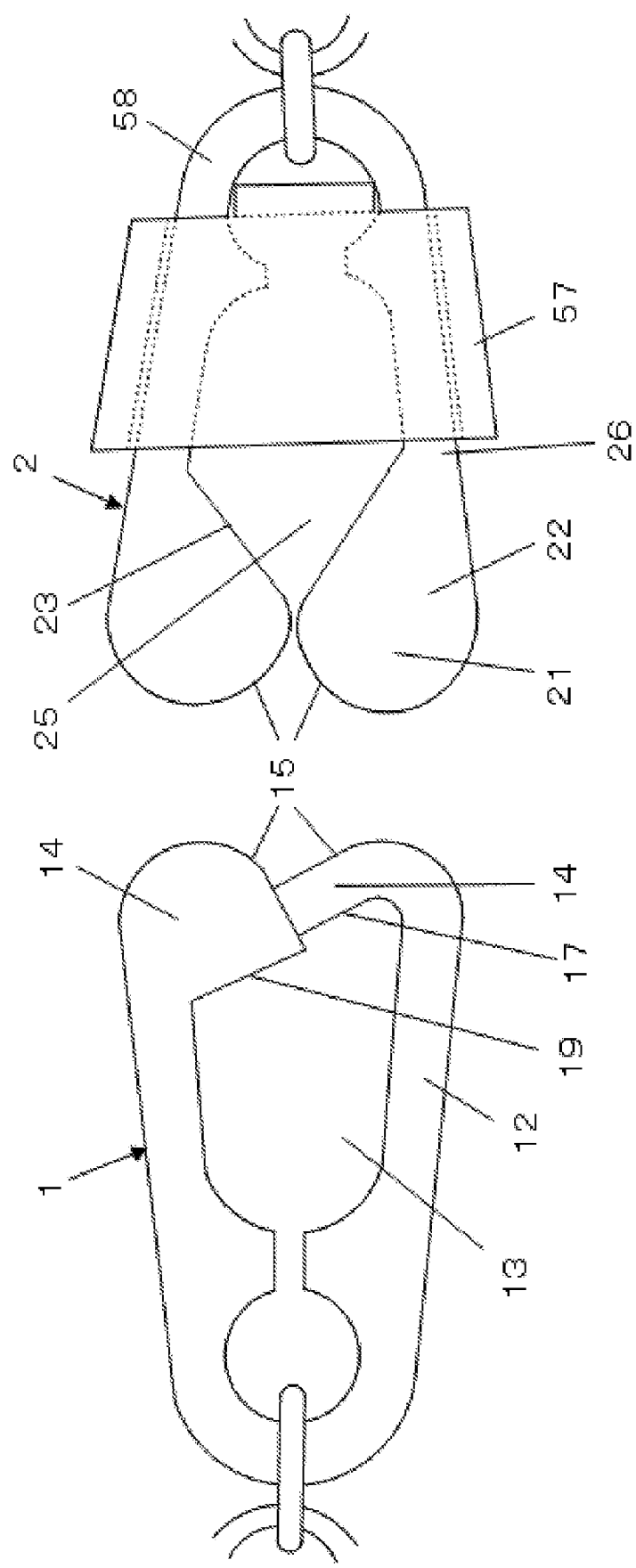
FIG. 4 shows a female part (1) according to Embodiment 6 of the present invention and a male part (2) according to Embodiment 7 of the present invention.
Figure 5:
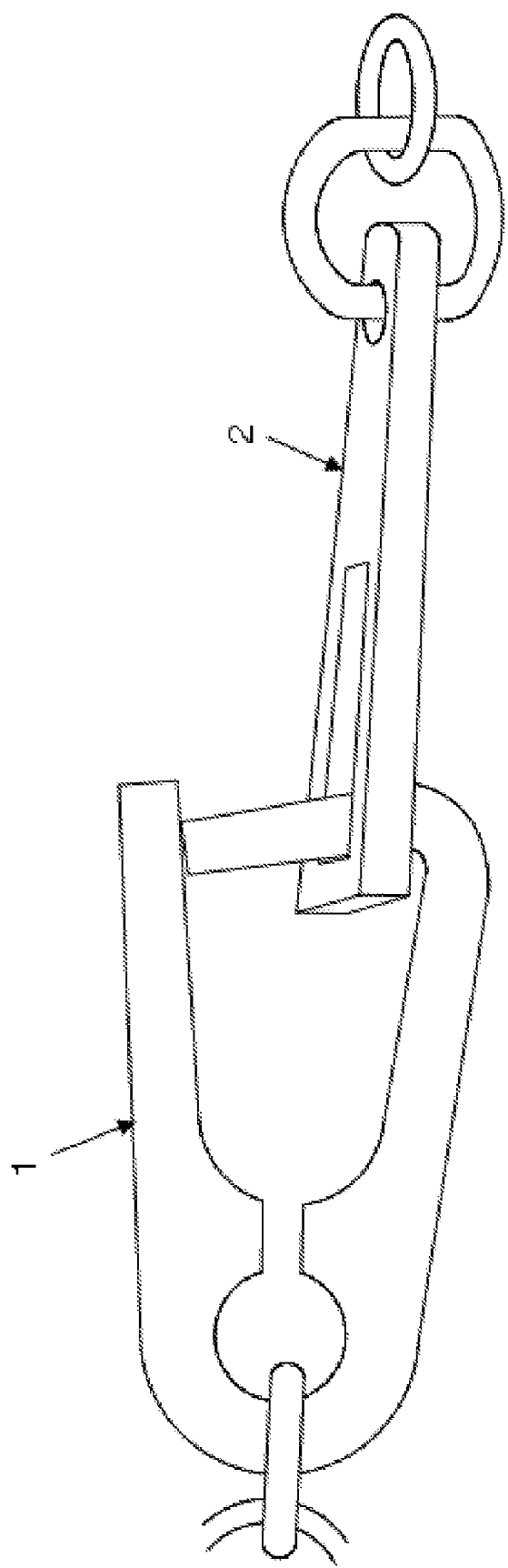
FIG. 5 shows an engagement state view of the fastener for accessories according to Embodiment 1 of the present invention. The female part (1) is engaged with the male part (2).
Figure 6:
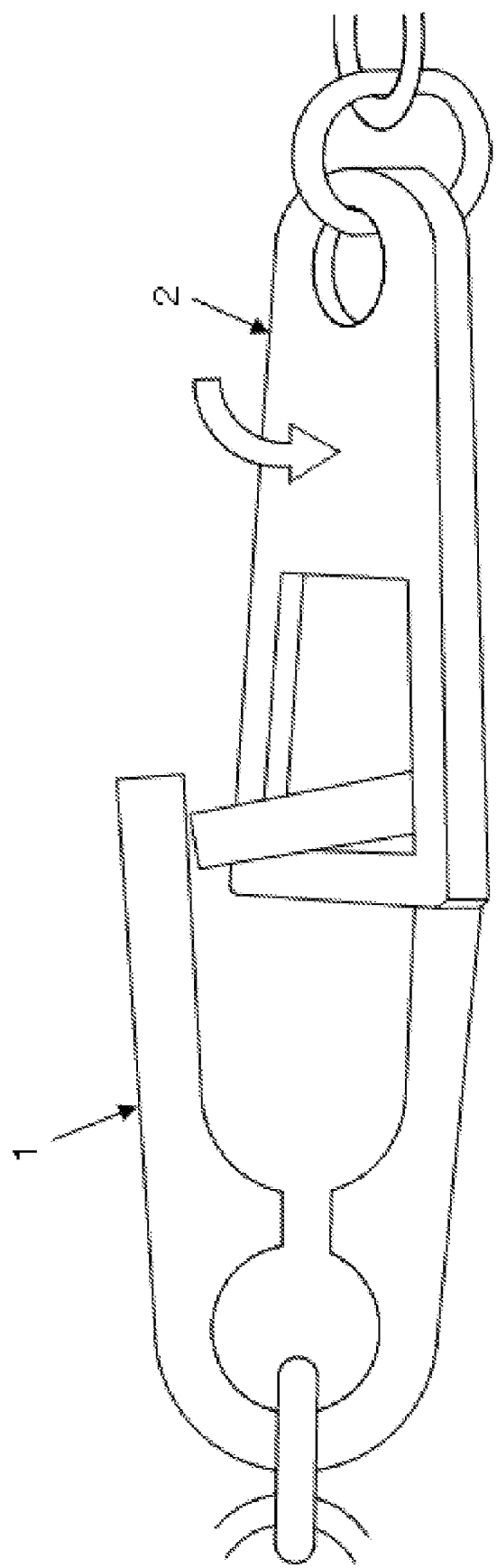
FIG. 6 shows a state view of the fastener for accessories according to Embodiment 1 of the present invention. The male part (2) has just started to disengage from the female part (1) by twisting the male part (2).
Figure 7:
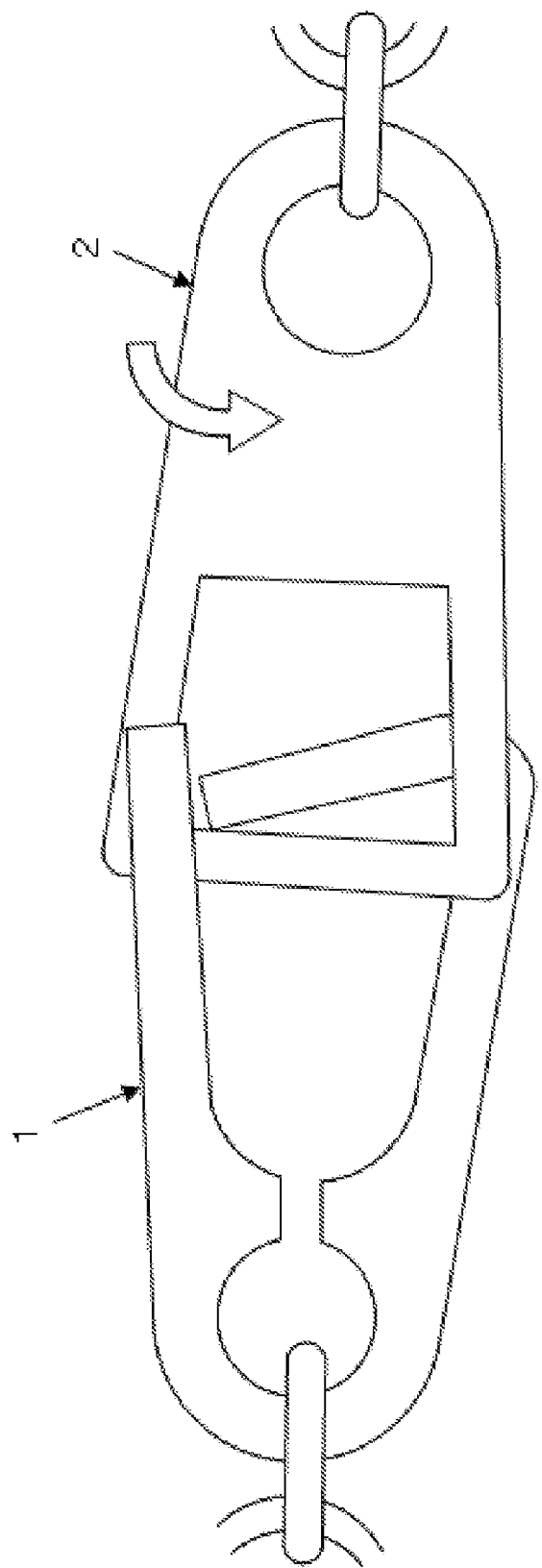
FIG. 7 shows an operation state view of the fastener for accessories according to Embodiment 1 of the present invention. The locking frame body (22) of the male part (2) pushes a holding frame body (12) of the female part (1) and the opening part (14) is now open.
Figure 8:
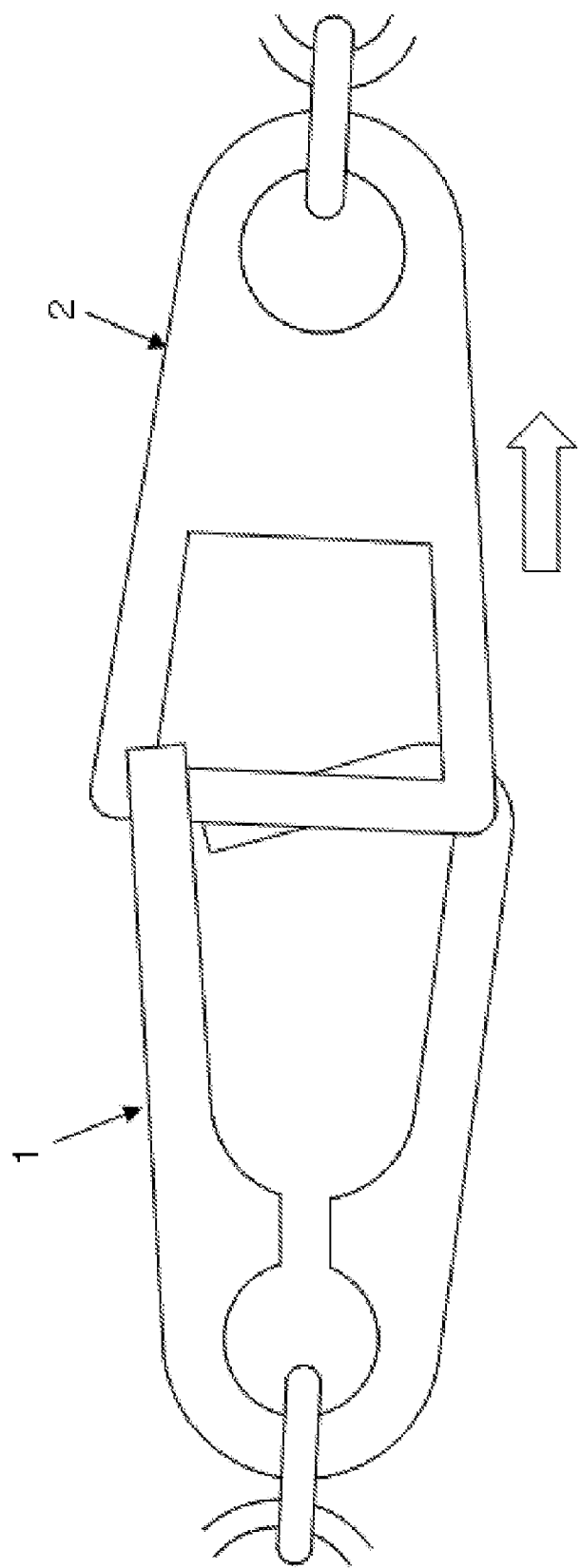
FIG. 8 shows an operation state view of the fastener for accessories according to an embodiment 1 of the present invention. The male part (2) is almost disengaged from the female part (1).
Figure 9:
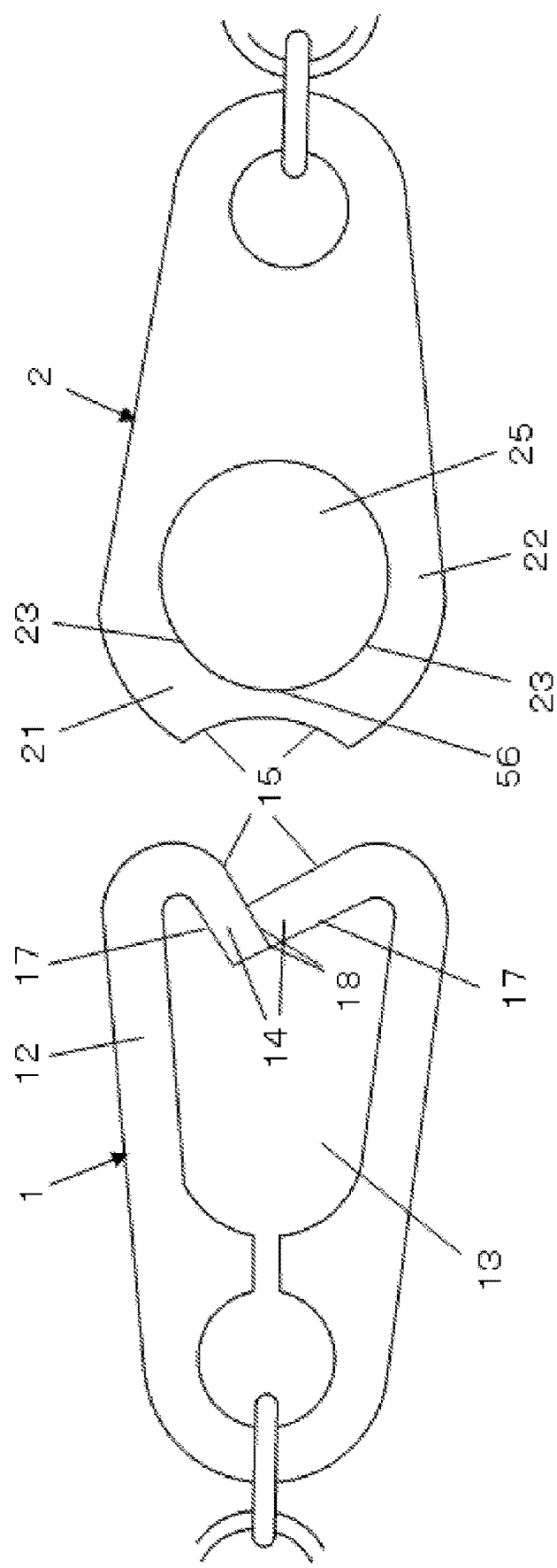
FIG. 9 shows an explanatory view of parts of a fastener for accessories according to Embodiment 2, 4, 5 and 8 of the present invention.
Figure 10:
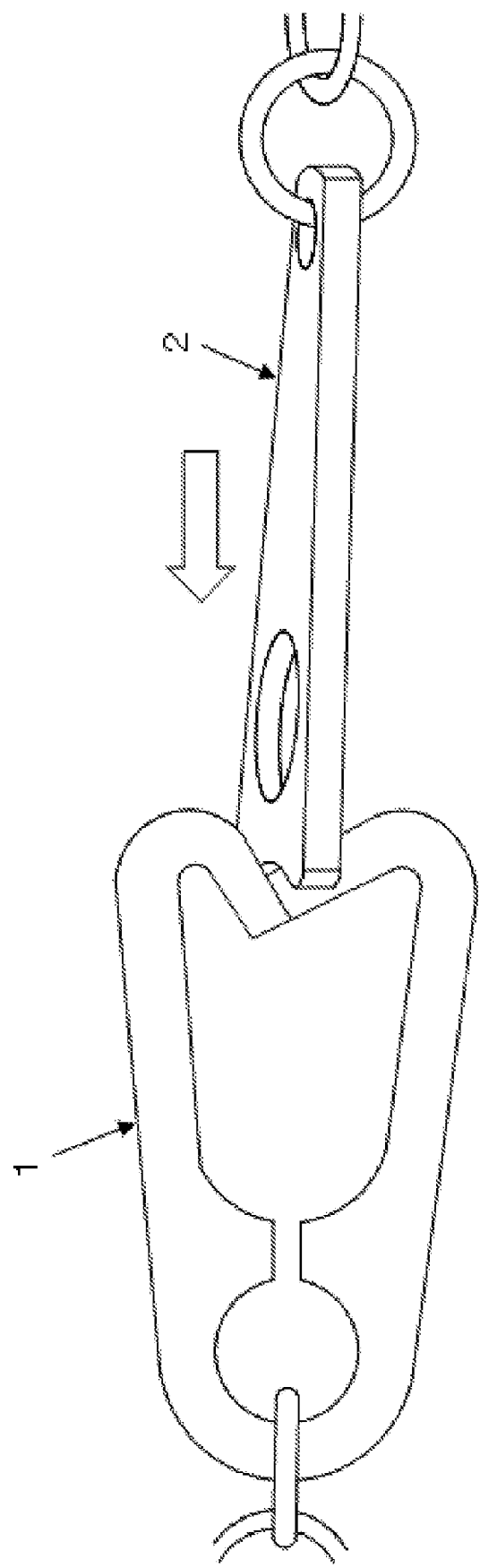
FIG. 10 shows an operation state view of the fastener for accessories according to Embodiments 2, 4, 5 and 8 of the present invention. A locking part (21) of the male part (2) is closing to a guide part (15) of the female part (1).
Figure 11:
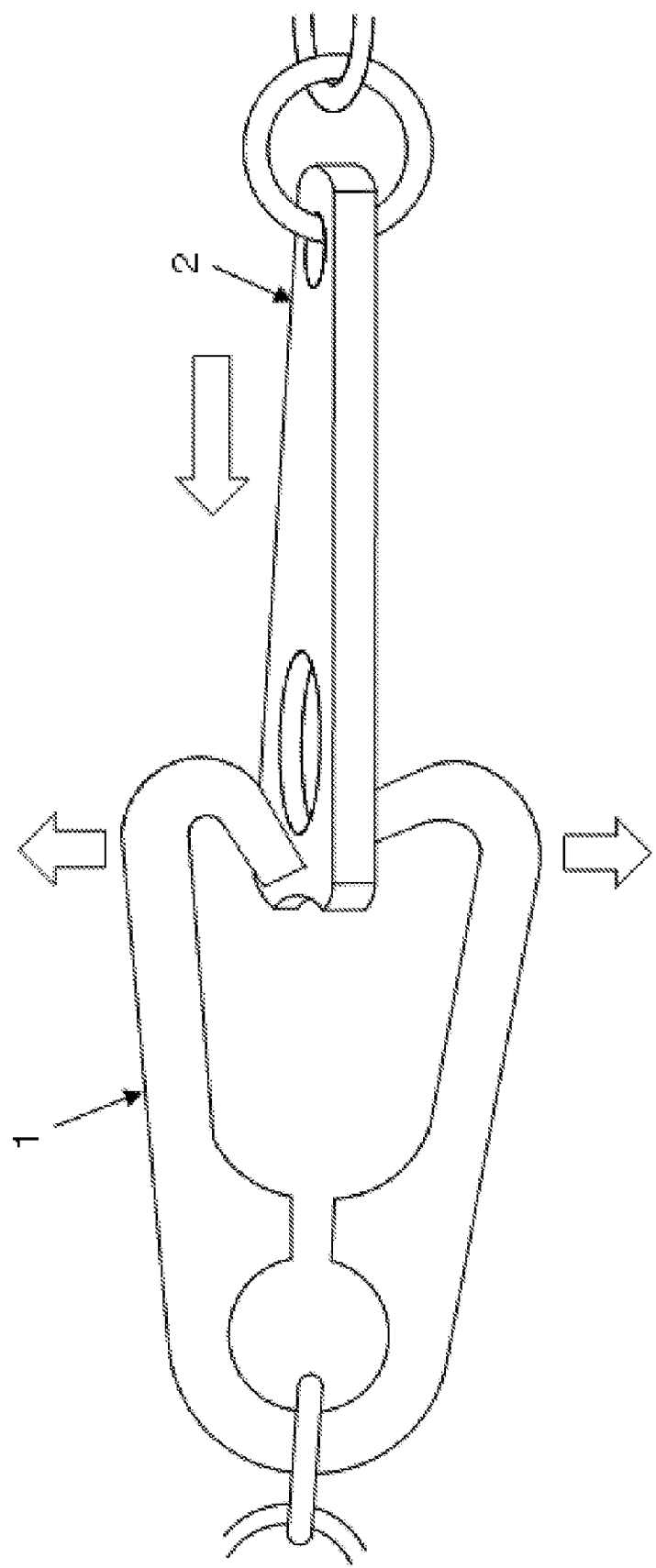
FIG. 11 shows an operation state view of the fastener for accessories according to Embodiment 2, 4, 5 and 8 of the present invention. The locking part (21) of the male part (2) is already in contact with the guide part (15) of the female part (1) and is pushing the opening part (14) to open.
Figure 12:
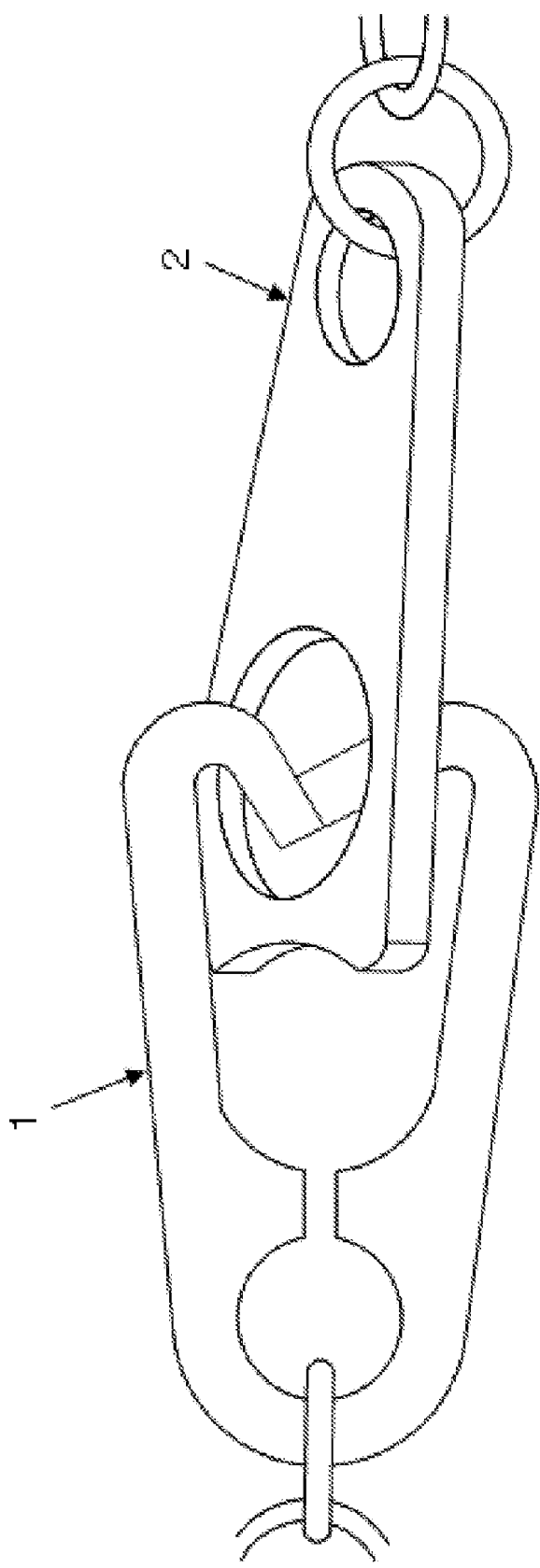
FIG. 12 shows a operation state view of the fastener for accessories according to Embodiment 2, 4, 5 and 8 of the present invention. This figure shows that the male part (2) has just been engaged with the female part (1).
Figure 13:
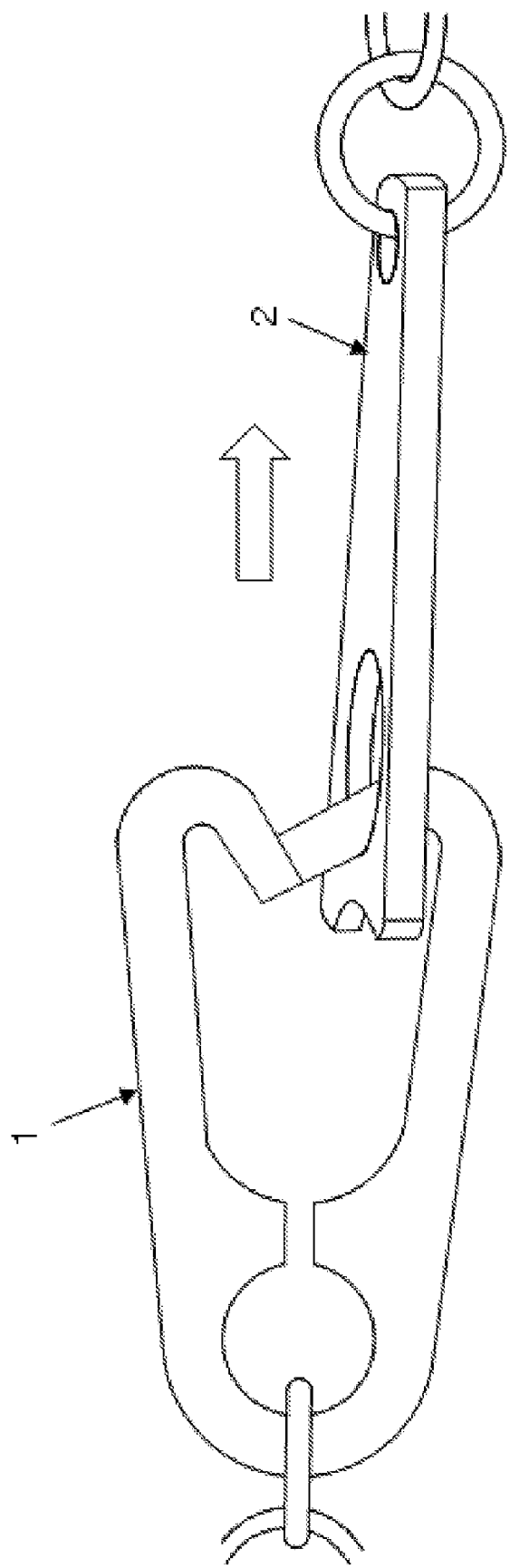
FIG. 13 shows an operation state view of the fastener for accessories according to Embodiment 2, 4, 5 and 8 of the present invention. Disengagement has just started by placing the front part of the holding space (13) or the opening part (17) of the female part (1) with the guide part (23) for disengagement.

As shown in FIG. 3, since a length (A) of the opening part (14) of the female part (1) is shorter than a length (B) between the locking frame bodies (22) of the male part (2), the opening part (14) of the female part (1) is easily opened by twisting them when it is engaged/disengaged. This structure requires only a very small force and is very convenient. In case when a length (C) between the locking frame bodies (22) is shorter than the length of the opening part (14) of the female part (1) (C is shorter than A in FIG. 1), a locking frame body (22) is caught at the opening (14) of the female part (1) even if it is twisted. As a result, the female part (1) is not opened.

However, in case where the length (B) between the locking frame bodies (22) is longer than the length (A) of the opening part (14) (B is longer than A in FIG. 3), an inner part of the locking part (21) of the male part (2) can move to a engagement-separating gap (18) along an inner side of the opening part (14) of the female part (1) by twisting. At this point, the locking frame body (22) is in contact with a holding frame body (12). By twisting the holding frame body (12) more or by twisting the female part (1) and the male part (2) and making the female part (1) and the male part (2) almost parallel, the locking frame body (12) is pushed and the opening part (14) will be opened. Then, the fastener for accessories is characterized in that the female part (1) or the male part (2) will be pulled toward a disengagement direction so that the fastener for accessories will be disengaged.

In terms of reference 1, the male part can be engaged with the female part by twisting the male part almost 90 degrees and passing the whole male part through the female part. Therefore, the size of the female part is required to be long enough along the longitude direction for the male part to pass through. In addition, the male part of reference 1 should have a short vertical length against the longitude direction so the female part won't be as long. Furthermore, a pinching part should be longer enough to prevent the male part from rotating. As a result, the male part cannot help being long along a centerline direction of the longitude axis.

Since the entire male part (2) of the present invention is not necessary to pass through the female part (1), the size of the fastener for accessories according to the present invention can be much smaller than reference 1. The male part (2) is not required to rotate 90 degrees, so the length of the pinching part for the present invention can be the same as conventional ones. In other words, although the appearance of the present invention may be similar to reference 1, a vertical/horizontal ratio of the male part (2) and female part (1) according to the present invention is very different from reference 1. The length of the male part (2) and female part (1) according to the present invention is also very different from reference 1. If the holding frame body (12) of the female part (1) becomes longer, a closing force of the opening part (14) will be lessened (the closing force is in inversely proportion to the length of the holding frame body (12)). If the closing force is weak, there is a risk that disengagement could often happen. Or, the thickness of a fastener should be thicker for reinforcement. In order to make the fastener for accessories smaller, the present invention compares the length between the locking frame parts (22) of the male part (2) with the length of the opening part (14) of the female part (1) and limit said lengths. Furthermore, how to engage/disengage is limited to twisting and the position of the engagement-separating gap is limited to the female part (1) or the inside of the male part (2).

In the industry of jewelry, although small parts are required, large parts are not. Herein, the length of the opening part (14) is defined as a length vertically against the centerline of the longitude axis of the female part (1). The length between the locking frame bodies (22) of the male part (1) means the maximum length among lengths vertically against the centerline of the longitude axis of the male part (2). A guide part for insertion or a guide part for engagement/disengagement is a part, which is not parallel against the centerline of the female part (1) or the male part (2). The guide parts are the parts that can cause insertion or engagement/disengagement between the female part (1) and the male part (2).

Embodiment 2

A fastener for accessories according to embodiment 2 of the present invention comprises a pair of a female part (1) and a male part (2). An inner side of a locking part (21) of the male part (2) has a pair of guide parts (23) for engagement/disengagement. The tip of the two guide parts (23) for engagement/disengagement is situated near a centerline of a longitude axis of the male part (2).

On the other hand, the female part (1) comprises a pair of opening parts (14), which can close elastically, and a pair of guide parts (15) for insertion around an outer side of the opening parts (14).

Figure 14:
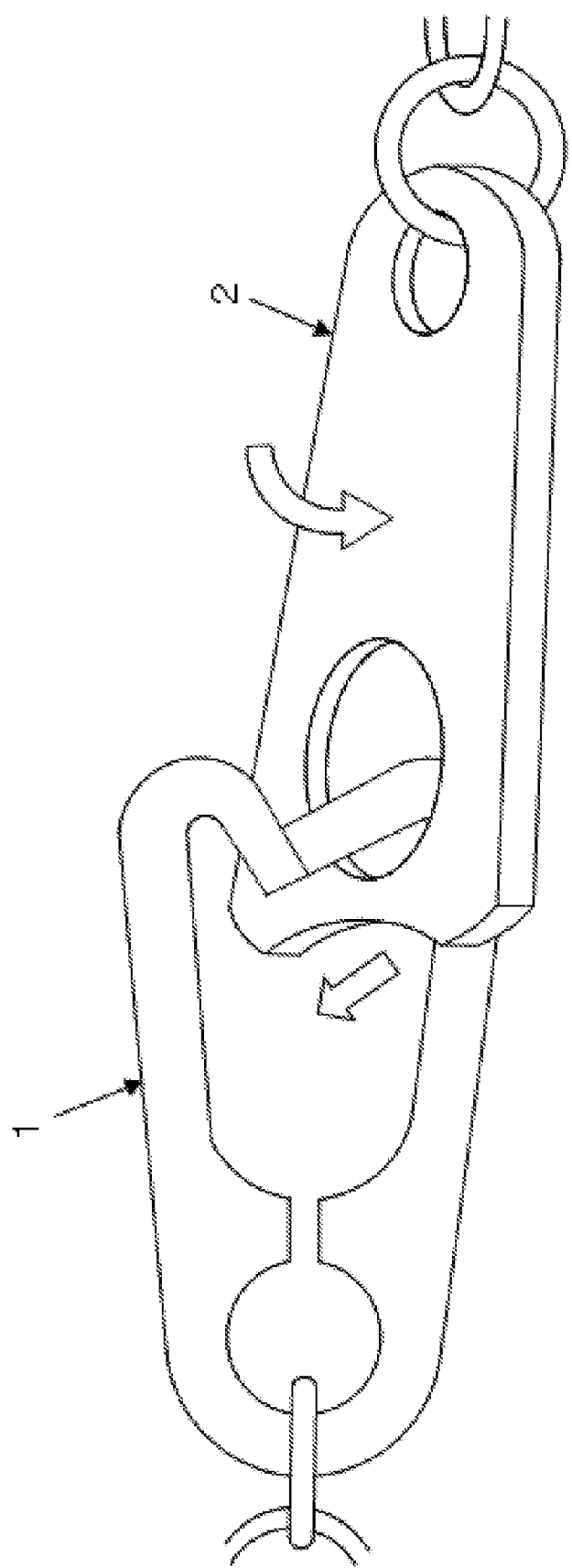
FIG. 14 shows an operation state view of the fastener for accessories according to Embodiment 2, 4, 5 and 8 of the present invention. By twisting and pulling the male part (2), the guide part (23) for disengagement of the male part (2) is shifting toward an engagement-separating gap (18) along the front part of the holding space (13) of the female part (1) or the opening part (17).
Figure 15:
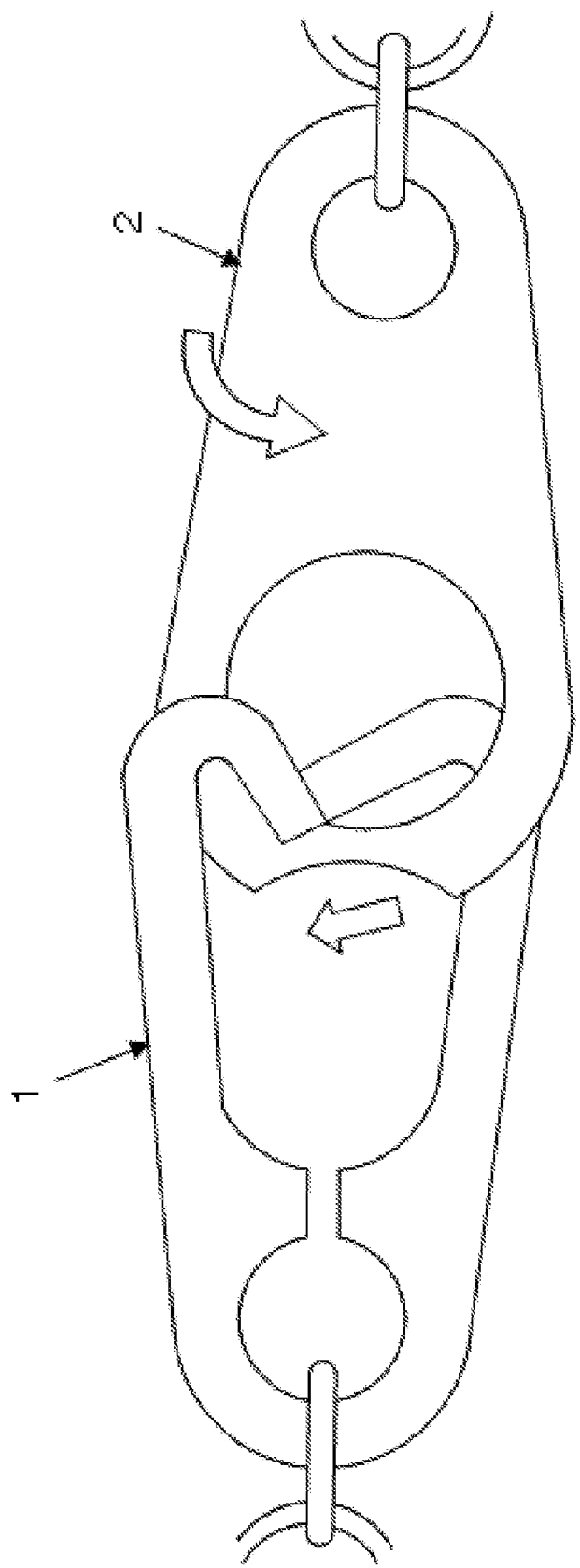
FIG. 15 shows an operation state view of the fastener for accessories according to Embodiment 2, 4, 5 and 8 of the present invention. By twisting the male part (2) more, the guide part (23) for disengagement of the locking part (21) has shifted to the engagement-separating gap (18).
Figure 16:
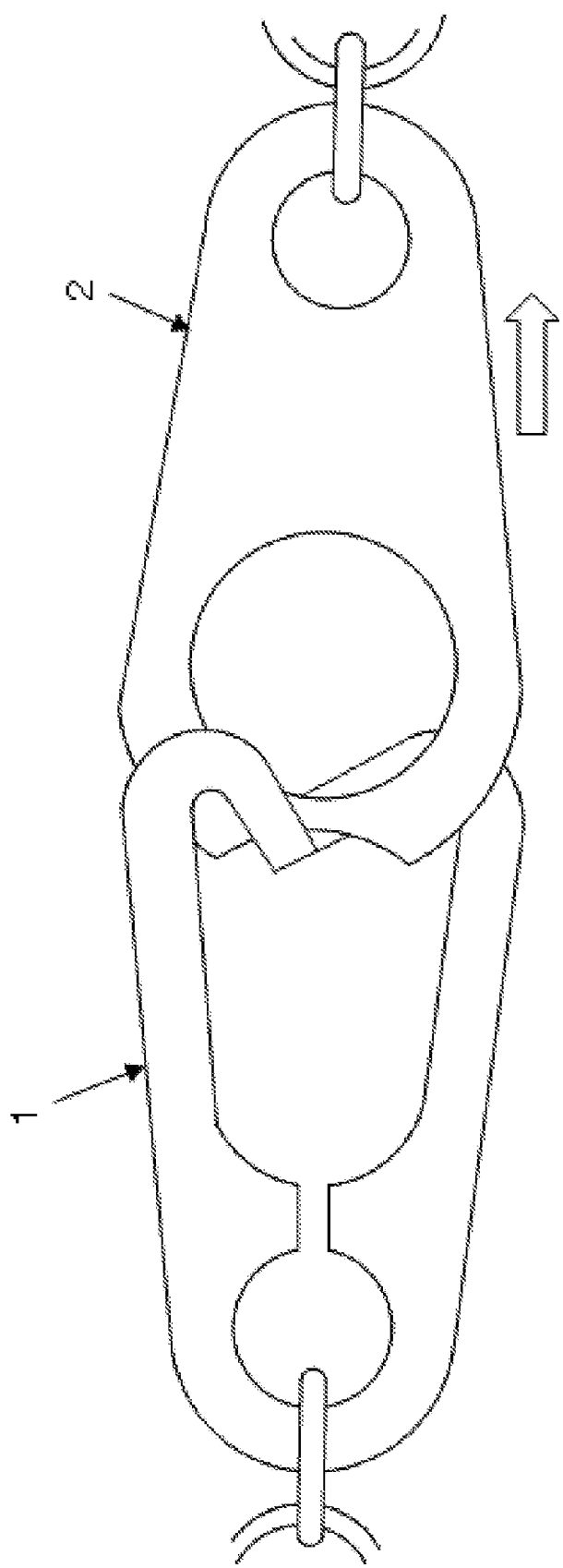
FIG. 16 shows a operation state view of the fastener for accessories according to an embodiment 2, 4, 5 and 8 of the present invention. With the engagement-separating gap (18) opening, the locking part (21) is shifting from the holding space (13) to the outer space of the female part (1) by pulling the male part (2) to achieve disengagement.

Since the male part (2) comprises a pair of guide parts (23), which is longer than a pair of the opening parts (14) of the female part (1) for engagement/disengagement, the fastener for accessories can smoothly be engaged/disengaged whether it is rotated to the right or the left (refer to FIG. 14, FIG. 15, and FIG. 16).

In case when a user takes off a necklace, the user cannot check by looking properly, because the user has to handle the necklace at the back of the neck. Some people like to rotate to the right, while others like to rotate to the left. Therefore, the fastener for accessories, which can be engaged/disengaged by twisting both to the right and the left rotation, can be very convenient.

Embodiment 3

A fastener for accessories according to embodiment 3 of the present invention comprises a pair of a female part (1) and a male part (2). In terms of a cross-section shape of a holding frame body (12) of the female part (1), the ratio of the vertical length of the cross-section shape is 1 to less than 2 of the horizontal length of the cross-section shape. Or the ratio of the horizontal length of the cross-section shape is 1 to less than 2 of the vertical length of the cross-section shape. The opening part of reference 1 has only an opening/closing movement in a vertical direction. The back part around the centerline of a longitude axis has a thick wall part in a vertical direction. However, since a wall part in a horizontal direction is thin, a metal fatigue fracture may be generated in the horizontal direction by twisting the fastener. In other words, the aperture width in the vertical direction will be the same as the aperture width in the horizontal direction when they are twisted. Therefore, the thickness in the vertical direction should be the same as the thickness in the horizontal direction.

Embodiment 4

A fastener for accessories according to embodiment 4 of the present invention comprises a pair of a female part (1) and a male part (2). The tip side of one opening part (14) of the female part (1) is opposed to an outer guide part (15) for insertion of another opening part (14), or is not parallel to the centerline along a longitude axis. An unexpected force for engagement/disengagement works parallel to the centerline along the longitude axis. If an engagement-separating gap is not parallel, the structure has a high friction coefficient and occurs an unexpected disengagement. In addition, the tip of the opening part (14) is formed at a sharp angle in general to avoid an unexpected disengagement. However, metals such as gold and platinum are easily bendable while using. Therefore, this will lead to defective products. In Embodiment 4, the tip of the opening part (14) is formed in a round shape in order to prevent deformation of parts. In addition, since the opening part (14) is not parallel to the centerline along the longitude axis, the fastener can prevent an unexpected disengagement.

Embodiment 5

A fastener for accessories according to embodiment 5 of the present invention comprises a pair of a female part (1) and a male part (2). The tip of one opening part (14) belonging to the female part (1) extends longer toward the inner direction than another opening part (14) belonging to the female part (1). In other words, there is a step at the tip of said opening parts (14). A locking part (21) of the male part (2) cannot stop between the opening parts (14) even if an unexpected force is applied to the fastener for accessories. This structure can prevent the fastener for accessories from slipping down on accident.

Embodiment 6

A fastener for accessories according to embodiment 6 of the present invention comprises a pair of a female part (1) and a male part (2). At the inner part of one opening part (14) belonging to the female part (1), an angle formed by a holding frame body (12) and a guide part (19) for engagement/disengagement is set to an obtuse angle. At the inner part of another opening part (14) belonging to the female part (1), an angle formed by a holding frame body (12) and the front part of a holding space (13) or an inner side (17) of the another opening part (14) is set to an acute angle. The tip of the other opening part (14) is opposed to the tip of the one opening part (14) or an outer guide part (15) for insertion. Even if an unexpected force is applied to the fastener for accessories, the inner side of a locking part (21) of the male part (2) can move through an engagement-separating gap (18) along the guide part (19) for engagement/disengagement at the obtuse angle side. Then it moves toward the front part of a holding space (13) at the acute angle side or the inner side (17) of the opening part (14) and stops. Since the engagement-separating gap (18) can be a passing point with little frictional resistance, an unexpected engagement/disengagement will not occur.

Embodiment 7

A fastener for accessories according to embodiment 7 of the present invention comprises a pair of a female part (1) and a male part (2). The male part (2) comprises a circular locking frame body (22), which is formed non-continuously linear, a locking accepting part (25), which is surrounded by the locking frame body (22), and a neck part (26), which is located at the back of the locking frame body (22). The periphery of the neck part (26) of the male part (2) has an outer shell (57), which is formed continuously linear or non-continuously linear. In addition, the tip of the locking frame part (22) has a locking part (21), which can close elastically. The inner side of the locking part (21) has a guide part (23) for engagement/disengagement. Even if an unexpected force is applied to the fastener for accessories, the outer shell (57) can prevent the locking part (21) of the male part (2) from opening so that this can prevent the fastener for accessories from disengagement. When it is engaged/disengaged, since the male part (2) comprises the guiding part (23) inside the locking part (21) of the male part (2), by twisting the male part (2) toward the opposite direction against when it is engaged and pulling the male part (2), the locking part (21) of the male part (2) will be opened. Then the female part (1) and the male part (2) can be pulled toward a disengagement direction resulting in an engagement between the female part (1) and the male part (2) released.

Embodiment 8

In terms with a fastener for accessories according to embodiment 8 of the present invention, a non-return claw (14) (sometimes called a lobster claw) means that an inner angle between a holding frame body (12) and the opening part (14) is from 0 degrees to 90 degrees.

Embodiment 9

A fastener for accessories according to embodiment 9 of the present invention comprises a pair of a female part (1) and a male part (2). The fastener for accessories is characterized in that an inner angle between a holding frame body (12) and an opening part (14) of the female part (1) is between more than 45 degrees and less than 90 degrees. When it is engaged/disengaged, if the inner angle is less than 45 degrees, frictional resistance can be too large to handle smoothly. Because the fastener for accessories is too small to check by looking, a smooth operation is indispensable.

Figure 17:
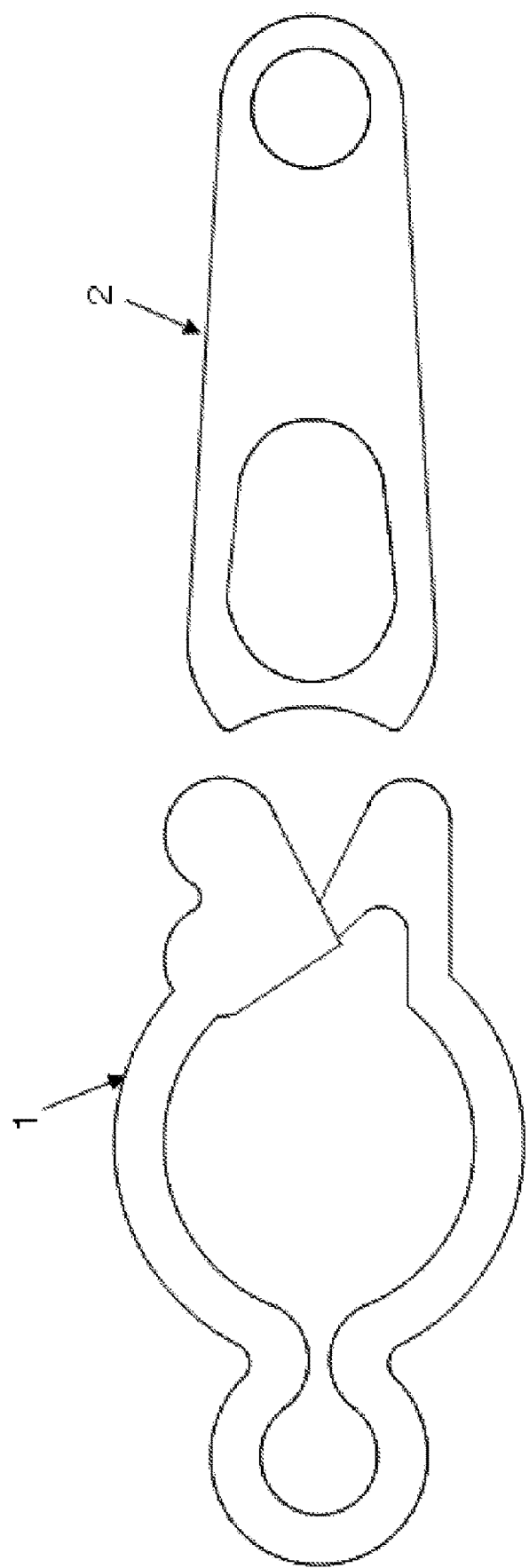
FIG. 17 shows a reference figure of another shape of the present invention.

Herein, a fastener for accessories shown in FIG. 17 can provide the same functions and the same effects as Embodiments mentioned above.

INDUSTRIAL APPLICABILITY OF THE INVENTION

The fastener for accessories according to the embodiments of the present invention can be applied to all kinds of accessories, which have a connection part for connecting parts, such as a necklace shown in FIG. 1.

NUMERICAL REFERENCES

1—Female part
12—Holding frame body
13—Holding space
14—Opening part or Non-return claw
15—Guiding part for insertion
17—Front part of the holding space or Inner side of the opening part
18—Engagement-separating gap
19—Guide part for engagement/disengagement of the female part
2—Male part
21—Locking part of the male part
22—Locking frame body
23—Guide part for engagement/disengagement of the male part
25—Locking accepting part
26—Neck part
56—Assembly point of a pair of the guide parts for engagement/disengagement of the male part
58—Rear point of the male part
A—Length of the opening part
B—Length between the locking frame bodies (B is longer than A)
C—Length between the locking frame bodies (C is shorter than A)
D—Centerline of a longitude axis of the female part or the male part

What is claimed is:

1. A fastener for accessories comprising a female part and a male part,
    wherein the male part comprises:
        a circular locking frame body, which is formed continuously linear or non-continuously linear;
        a locking accepting part, which is surrounded by the circular locking frame body; and
        at least one locking part, which is located at a tip of the circular locking frame body, wherein the tip encloses the locking accepting part,
    wherein the female part comprises:
        a circular holding frame body, which is formed non-continuously linear, and
        a holding space, which is surrounded by the circular holding frame body,
    wherein the female part further comprises an opening part, which closes elastically, at a tip of the circular holding frame body, and wherein the opening part and the circular holding frame body do not criss-cross or overlap with each other in both a locked and unlocked configuration of the male part with respect to the female part,
    wherein an inner angle between the holding frame body and the opening part is from 0 degrees to 90 degrees,
    wherein the opening part has a guide part for insertion of the at least one locking part in the holding space of the female part such that the guide part is inserted through the locking accepting part of the male part,
    wherein a first length of the opening part of the female part is shorter than a second length between the circular locking frame body of the male part,
    wherein the first length of the opening part is defined as a length vertically against a centerline of a longitudinal axis of the female part,
    wherein the second length between the circular locking frame body of the male part is a maximum length among lengths vertically against a centerline of the longitude axis of the male part,
    wherein the female part further comprises an engagement-separating gap, which is located at a tip of the opening part or an inner side of the tip, for disengagement in order for the at least one locking part of the male part to move from the holding space to an outer space,
    wherein the engagement-separating gap is opened by pulling the female part from the male part while twisting one another, to disengage the fastener for accessories, and wherein the fastener for accessories is engaged/disengaged by twisting both to the right and the left rotation.

2. The fastener for accessories according to claim 1,
    wherein an inner side of the at least one locking part has a guide part for engagement and disengagement,
    wherein the tip of the circular holding frame body of the female part comprises a pair of opening parts which closes elastically, and
    wherein an outside of the pair of opening parts comprises a guide part for insertion.

3. The fastener for accessories according to claim 1,
    wherein a rear part of the female part is connected to an end of an accessory, and
    wherein a cross-section shape of the circular holding frame body of the female part is characterized in that a ratio of a vertical length is 1 to less than 2 of a horizontal length.

4. The fastener for accessories according to claim 1, wherein a cross-section shape of the circular shape of the circular holding frame body of the female part is characterized in that a ratio of a horizontal length is 1 to less than 2 of a vertical length.

5. The fastener for accessories according to claim 2,
    wherein a tip of one opening part of the pair of opening parts is opposed to the guide part of another opening part of the pair of opening parts.

6. The fastener for accessories according to claim 2, wherein a tip of one opening part of the pair of opening parts is around a centerline along a longitude axis and is not parallel to the centerline along the longitude axis.

7. The fastener for accessories according to claim 2,
    wherein a tip of one opening part of the pair of opening parts of the female part extends longer toward an inner direction than another opening part of the pair of opening parts of the female part.

8. The fastener for accessories according to claim 2,
    wherein an inner side of one opening part of the pair of opening parts has a guide part for engagement and disengagement.

9. The fastener for accessories according to claim 1,
    wherein the at least one locking part closes elastically at a tip of the circular locking frame body,
    wherein the male part further comprises:
        an engagement-separating gap at a tip of the at least one locking part or an inner side of the tip of the at least one locking part; and
        a neck part,
    wherein the male part further comprises a guide part for engagement and disengagement at a front of the locking accepting part or an inner side of the at least one locking part, and
    wherein the male part further comprises an outer shell which is formed continuously linear or non-continuously linear.

10. The fastener for accessories according to claim 1,
wherein the opening part has a protrusion extending to the center of the holding space, the protrusion catches the opening part of the circular holding frame body of the female part inside the circular locking frame body of the male part, and
wherein the female part further comprises a non-return claw which prevents the circular holding frame body from opening.

11. The fastener for accessories according to claim 1,
wherein an inner angle between the circular holding frame body and an opening part of the pair of opening parts is between more than 45 degrees and less than 90 degrees.

12. A fastener for accessories comprising:
a male part comprising:
- a circular locking frame body, which is formed continuously linear or non-continuously linear;
- a locking accepting part, which is completely surrounded by the circular locking frame body; and
- a locking part, which is located at a tip of the circular locking frame body, wherein the tip encloses the locking accepting part;

a female part that is not structurally continuous to the male part, wherein the female part comprises:
- a circular holding frame body, which is formed non-continuously linear;
- a holding space, which is surrounded by the circular holding frame body, wherein the holding space is configured to accept the locking part of the male part such that the locking accepting part of the male part interlocks with the holding space;
- an opening part, which closes elastically, at a tip of the circular holding frame body, wherein the opening part and the circular holding frame body do not criss-cross or overlap with each other in both a locked and unlocked configuration of the male part with respect to the female part, wherein an inner angle between the holding frame body and the opening part is from 0 degrees to 90 degrees, wherein the opening part has a guide part for insertion of the locking part in the holding space of the female part such that the guide part is inserted through the locking accepting part of the male part, wherein a first length of the opening part of the female part is shorter than a second length between the circular locking frame body of the male part, wherein the first length of the opening part is defined as a length vertically against a centerline of a longitudinal axis of the female part, and wherein the second length between the circular locking frame body of the male part is a maximum length among lengths vertically against a centerline of the longitude axis of the male part; and
- an engagement-separating gap, which is located at a tip of the opening part or an inner side of the tip, to permit the locking part of the male part to engage and disengage with respect to the holding space, wherein the engagement-separating gap is opened by pulling the female part from the male part while twisting one another, to disengage the fastener for accessories.

* * * * *